United States Patent [19]
Nobuoka et al.

[11] Patent Number: 6,031,569
[45] Date of Patent: *Feb. 29, 2000

[54] IMAGE SENSING METHOD AND APPARATUS UTILIZING THE SAME

[75] Inventors: Kousuke Nobuoka, Yokohama; Susumu Kozuki, Tokyo, both of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/759,980

[22] Filed: Dec. 3, 1996

Related U.S. Application Data

[63] Continuation of application No. 08/395,756, Feb. 27, 1995.

[30] Foreign Application Priority Data

Feb. 28, 1994 [JP] Japan ................................. 6-029499
Feb. 28, 1994 [JP] Japan ................................. 6-029504

[51] Int. Cl.$^7$ ................................................ H04N 5/225
[52] U.S. Cl. ........................................ 348/220; 348/219
[58] Field of Search ................................. 348/266, 267, 348/270, 271, 272, 279, 281, 220, 219; H04N 9/07, 9/04, 5/225

[56] References Cited

U.S. PATENT DOCUMENTS

| | | | |
|---|---|---|---|
| 4,663,669 | 5/1987 | Kinoshita et al. | 348/220 |
| 4,714,963 | 12/1987 | Vogel | 348/220 |
| 4,998,164 | 3/1991 | Endo et al. | 348/219 |
| 5,402,171 | 3/1995 | Tagami et al. | 348/279 |
| 5,418,564 | 5/1995 | Aoki et al. | 348/279 |
| 5,508,742 | 4/1996 | Geerlings et al. | 348/279 |

*Primary Examiner*—Michael H. Lee
*Attorney, Agent, or Firm*—Morgan & Finnegan LLP

[57] ABSTRACT

In order to display a high resolution still image by using a single image sensor type image sensing apparatus employing a single relatively low resolution CCD, an image of an identical object is taken four times in short time intervals. Each time the image sensing operation is carried on, it is controlled that an imaging position on a photo-sensing surface of the CCD is shifted by one pixel. Color signals of the plurality of color components which are obtained as above are stored in a predetermined areas in an image memory by each color component. After four image sensing operations are completed, the color signals are read from the image memory, and the final color signals or brightness signals are generated based on the read color signals, and displayed on a display.

10 Claims, 5 Drawing Sheets

FIG. 2

|       | | | | |
|-------|----|----|----|----|
| n     | Ye | Cy | Ye | Cy |
| n+1   | Mg | G  | Mg | G  |
| n+2   | Ye | Cy | Ye | Cy |
| n+3   | G  | Mg | G  | Mg |

FIG. 4

| IMAGE SENSING PERIOD \ COLOR COMPONENT | Ye | Cy | Mg | G |
|---|---|---|---|---|
| 1<br>(x,y) = (0,0) | | | | |
| 2<br>(x,y) = (1,0) | | | | |
| 3<br>(x,y) = (1,1) | | | | |
| 4<br>(x,y) = (0,1) | | | | |
| 1+2+3+4 | 1 2 1 2<br>4 3 4 3<br>1 2 1 2<br>4 3 4 3 | 2 1 2 1<br>3 4 3 4<br>2 1 2 1<br>3 4 3 4 | 3 4 3 4<br>1 2 1 2<br>4 3 4 3<br>2 1 2 1 | 4 3 4 3<br>2 1 2 1<br>3 4 3 4<br>1 2 1 2 |

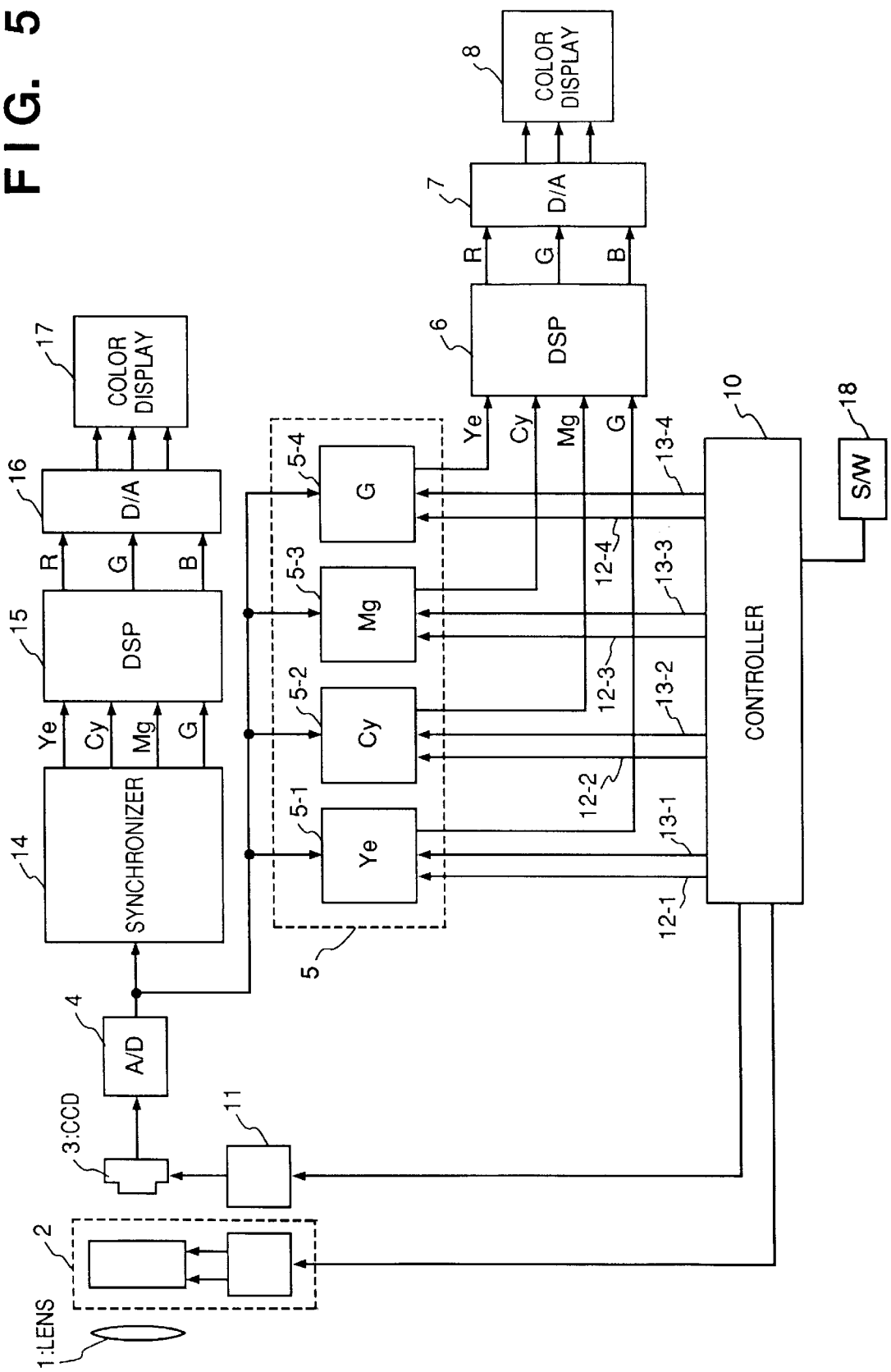

IMAGE SENSING METHOD AND APPARATUS UTILIZING THE SAME

This is a continuation of co-pending application Ser. No. 08/395,756, filed on Feb. 27, 1995.

BACKGROUND OF INVENTION

This invention relates to an image sensing method and apparatus and, more particularly, to an image sensing method and apparatus capable of achieving better resolution by using CCD, or the like, as two dimensional solid image sensing elements and by displacing a focal point of an object in two directions in a space area.

As a most well-known method of reproducing a color image by using a single piece of image sensing element, there is a method in which an image sensing element output signal, made by superposing a color carrier signal having half of a pixel sampling frequency on a brightness signal component. The signal is picked up by providing complementary color filters arranged in mosaic fashion on photo sensors of the image sensing element. The color information is obtained by Y/C separation of the image sensing element output signal. This method is widely applied to video cameras for personal use, and is very effective in providing inexpensive cameras.

Further, regarding an image sensing apparatus such as video camera using CCD, or the like, improvement of spatial resolution has been demanded. Especially, as a method to realize the improvement of the spatial resolution without simply increasing pixel density of CCD, there have been proposed some methods to improve apparent resolution. For example, Japanese Patent Application Laid Open No. 64-69160 discloses a method of displacing a CCD in the horizontal and vertical directions by using a piezoelectric element, and Japanese Patent Application Laid Open No. 63-284979 discloses a method of using optical path displacement mechanism provided between an image sensing lens group and a CCD.

However, in the aforesaid conventional examples, the frequency of a color carrier signal representing color information is only half of pixel sampling frequency, thus, it is theoretically impossible to reproduce high resolution color information. Therefore, although a single image sensor type image sensing apparatus is compact and inexpensive, it is not sufficient to use the obtained image when better image quality than those taken by a conventional personal use video camera is required.

Furthermore, in the aforesaid conventional image sensing apparatus, to simply improve resolution of the CCD itself is emphasized, and there lacks consideration regarding color signal processing. As a result, resolution of a black and white signal can be improved because of the improvement of resolution of the CCD, however, the improvement of resolution of the CCD does not directly contributes to improve resolution of a color image taken by a single image sensor type color video camera, which has been widely spread for personal use.

SUMMARY OF THE INVENTION

Accordingly, it is an object of the present invention to provide an image sensing apparatus especially capable of performing high resolution color image sensing of a still image with a simple construction without losing the merits of compactness and inexpensive single image sensor type image sensing apparatus.

According to the present invention, the foregoing object is attained by providing an image sensing apparatus comprising: a focusing lens for forming an image; a color separation filter composed of a plurality of color filter elements for n kinds of colors; an image sensing element having the color separation filter on the imaging surface; displacement means for displacing relative positions of the image and the imaging surface of the image sensing element; storage means for storing color signals outputted from the image sensing element; image sensing control means for controlling the displacement means so as to shift an imaging position relative to the imaging surface each time an image is taken; write control means for writing the color signals outputted from image sensing elements in the storage means each time after an image is taken; and signal generating means for generating a signal by comparing the color signals.

More specifically, when an image sensing apparatus takes an image of an identical object, four times, and color separation filter array arranged on a photoelectric converter of the CCD element is of a complementary color mosaic type for four colors (Ye, Cy, Mg, G) arranged as shown in FIG. 2, at each time the apparatus takes the image, each pixel is moved spatially by one pixel, and by reproducing a complementary color signal taken in the four times of image sensing operations on image memory areas each of which corresponds to each complementary color signal (Ye, Cy, Mg, G) as shown in FIG. 4, spatial resolution of the four complementary colors is improved. Further, by applying matrix operation to the complementary color signal generated as described above to convert into a RGB signal, or a brightness and a color difference signals, a color image of high resolution can be obtained.

It is another object of the present invention to provide an image sensing method, adopted in a single CCD type image sensing apparatus, capable of performing high resolution color image sensing by using a simple configuration.

According to the present invention, the foregoing object is attained by providing an image sensing method adopted to an image sensing apparatus having a focusing lens, color separation filter composed of two-dimensionally arranged unit arrays, each of which includes m pixels for n kinds of colors, so as to occupy a predetermined area, and an image sensing element having the color separation filter on the imaging surface, and capable of obtaining high precision still image comprising: image sensing step of taking an image of an identical object a plurality of times by slightly shifting an imaging position on the imaging surface by changing relative positions of the focusing lens and the imaging surface of the image sensing element each time the image is of the identical object is taken; storing step of storing color signals of the color-separated signals of a plurality of color components outputted from the image sensing element in the image-taking at the image sensing step in a storage medium; color signal generating step of generating a color signal by reading the color-separated signals of the plurality of color components stored in the storage medium by the storing step; and output step of outputting an image on the basis of the color signal generated at the color signal generating step.

In accordance with the present invention as described above, an image of an identical object is taken for a plurality of times, a focal point of the object is controlled to displace on a focal plane of an image sensing element each image sensing operation, color signals of plural color components relating the object image taken in accordance with the control are written in a storage medium, a color signal is generated by reading the color signals of the plural color components written in the storage medium after performing a plurality of image sensing operations, and an image is outputted based on the generated color signal.

It is still another object of the present invention to provide a single image sensor type image sensing apparatus having a plurality of operational modes capable of taking and displaying a high resolution still image or taking and displaying a moving image.

According to the present invention, the foregoing object is attained by providing an image sensing apparatus operable in a plurality of operation modes comprising: a focusing lens; a color separation filter composed of two-dimensionally arranged unit arrays, each of which includes m pixels for n kinds of colors, so as to occupy a predetermined area; an image sensing element having the color separation filter on the imaging surface; selecting means for selecting one of the plurality of operational modes; moving image generating and display means for generating and displaying a moving image on the basis of color-separated signals of a plurality of color components outputted from the image sensing element in accordance with the selected operational mode; and still image generating and display means for generating and displaying one frame of still image on the basis of color-separated signals of the plurality of color components outputted from the image sensing element obtained by taking an image of an identical object a plurality of times in accordance with selected operational mode.

In accordance with the present invention as described above, a high resolution still image signal and a low resolution moving image signal is displayed in accordance with the selected operation mode.

It is still another object of the present invention to provide an image sensing apparatus capable of obtaining a high resolution image.

According to the present invention, the foregoing object is attained by providing an image sensing apparatus comprising: image sensing means for converting an optical image into an electrical signal; a color separation filter having n kinds of color filters situated in front of the image sensing means; control means for controlling an imaging position n times so that an image of an identical object incidents on the corresponding portion of an imaging surface of the image sensing means through the n kinds of color filters; and combining means for combining n frames of image signals obtained by the image sensing means by being controlled n times by the control means.

In accordance with the present invention as described above, a focusing position is controlled so that an image of an identical object incidents on an identical portion of an image sensing means for n times, and image signals of a plurality (n) of images are combined.

The invention is particularly advantageous since a still color image of higher resolution beyond the conventional theoretical limitation on color information reproduction based on a single image sensing operation can be displayed by using an inexpensive CCD in a simple configuration and taking an image of an identical object plural times, where the limitation is due to the frequency, half of the pixel sampling frequency, of the color carrier signal representing color information obtained from the conventional single image sensor type image sensing element using a complementary color mosaic filter.

Further, according to the aforesaid object, regarding a single image sensor type color video camera using an inexpensive CCD, a high resolution still color image and an ordinary color moving image can be displayed with a simple configuration.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, incorporated in and constitute a part of the specification, illustrate embodiments of the invention and, together with the description, serve to explain the principles of the invention.

FIG. 2 shows a pattern of a complementary color mosaic filter provided on a photo-sensing surface of CCD 3;

FIG. 4 is a diagram showing a relationship among the number of times of image sensing operations, color components, and imaging positions; and FIG. 5 is a block diagram illustrating a configuration of an image sensing apparatus according to a second embodiment of the present invention.

DETAILED DESCRIPTION OF THE PREFERRED EMBODIMENT(S)

Preferred embodiment of the present invention will be described in detail in accordance with the accompanying drawings.

[First Embodiment]

Figure 1:
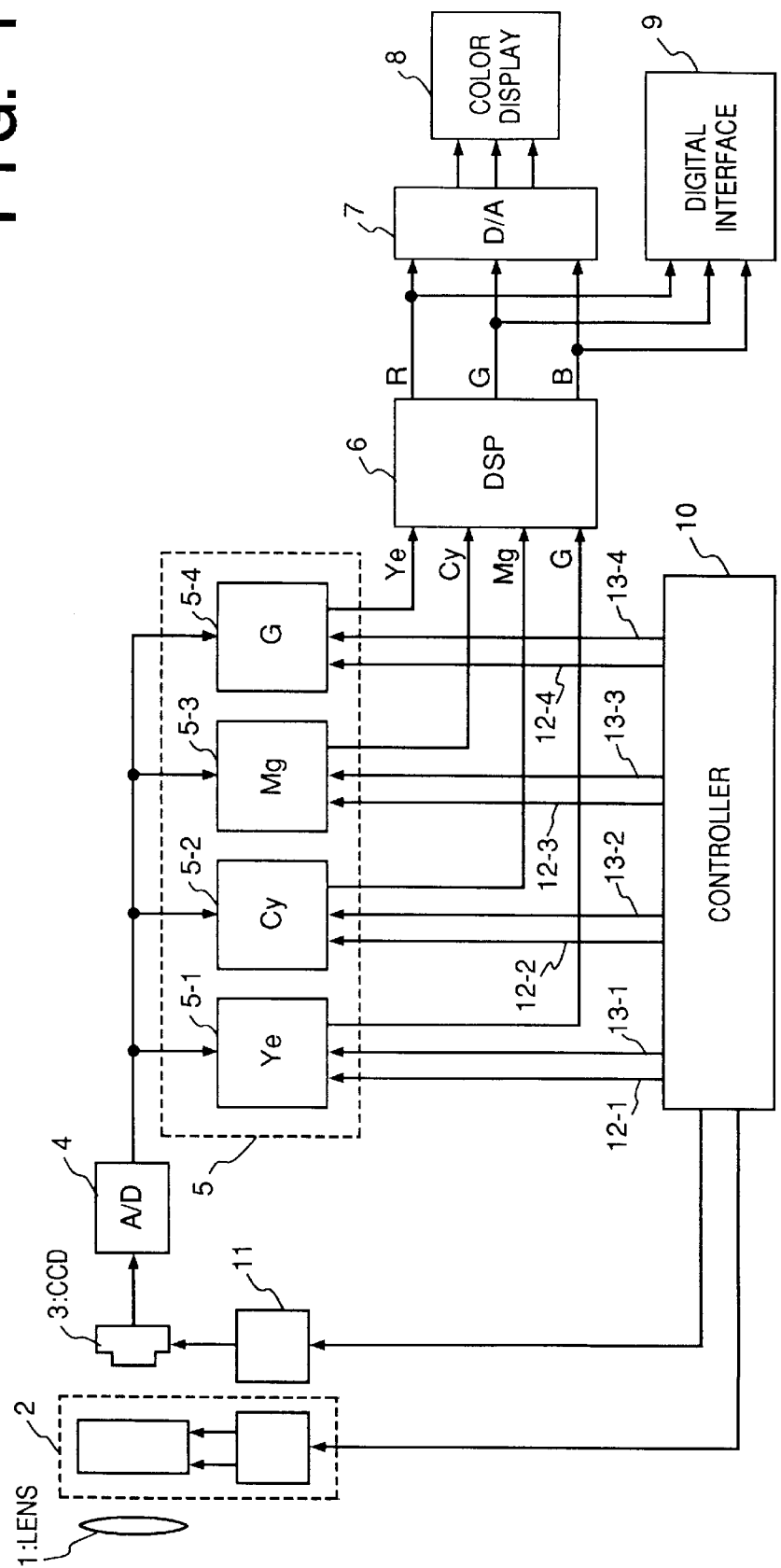
FIG. 1 is a block diagram illustrating a configuration of an image sensing apparatus according to a first embodiment of the present invention.
Figure 2:
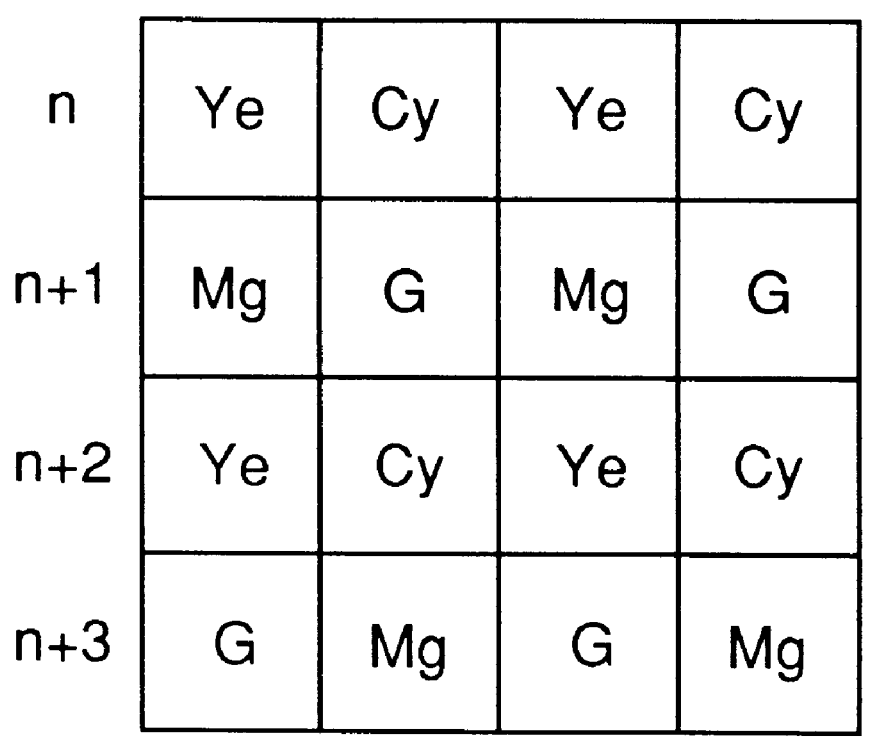

FIG. 1 is a block diagram illustrating a configuration of a single CCD type image sensing apparatus according to the first embodiment of the present invention. In FIG. 1, reference numeral 1 denotes a lens group, and reference numeral 2 denotes a light path shifter for shifting light path of the light received through the lens group 1. A configuration of the light path shifter 2 is that the top corner of a variable angle prism (VAP) which is an optical element is slightly changed so as to shift the light path of incoming light, or an image sensing element (CCD) is displaced in a plane perpendicular to an optical axis by using a piezoelectric element, or the like, thereby substantially changing the point where light reaches on the CCD, for instance. Reference numeral 3 denotes a CCD of which complementary color mosaic filter shown in FIG. 2 is attached at the photo-sensing surface; 4, an A/D converter; and 5, an image memory. The image memory 5 is divided into four partitions in order to store each signal, outputted from the A/D converter, of four color components, and respective partitions are called a Ye memory 5-1, a Cy memory 5-2, a M memory 5-3, and a G memory 5-4. Further, reference numeral 6 denotes a camera signal processor (DSP); 7, a three channel D/A converter; 8, a high precision color display; 9, a digital interface; 10, a controller; 11, a CCD driver; 12-1 to 12-4, control lines for address writing; 13-1 to 13-4, control lines for address reading.

Note that each of the four partitions of the image memory 5 has memory area enough to store one frame of image signals after four image sensing operations.

FIG. 2 is a diagram illustrating a pattern of the complementary color mosaic filter attached on the photo-sensing surface of the CCD 3. A CCD usually contains several hundred thousands of pixels of photo-sensing surface, and on the photo-sensing surface, a filter whose unit pattern is a 4×4 pixel matrix as shown in FIG. 2 is provided. In FIG. 2, G indicates a green filter, Mg indicates a magenta filter, Ye indicates a yellow filter, and Cy indicates a cyan filter, and corresponding pixels of the CCD receive light of the color of the filter on the each pixels.

Figure 3:
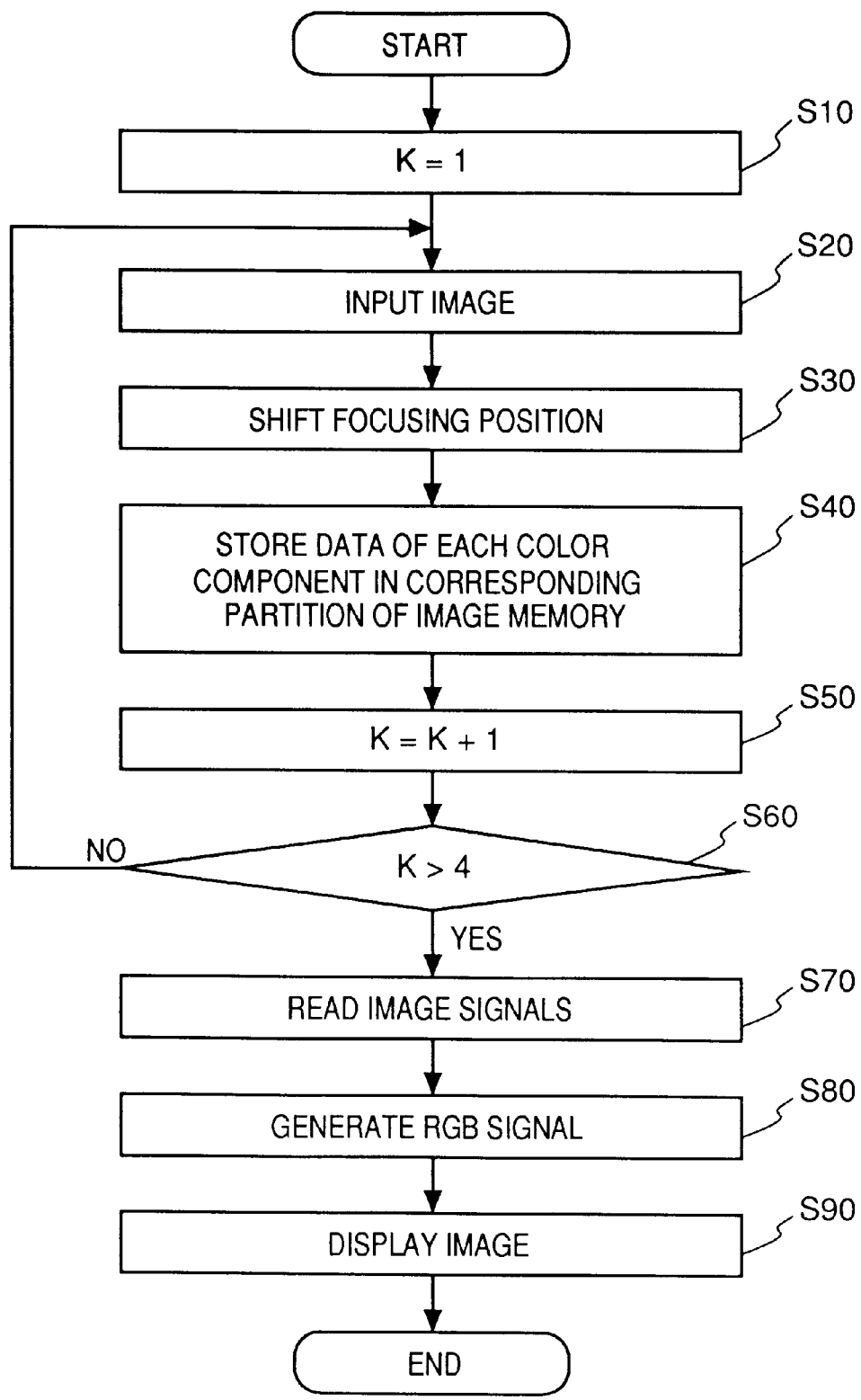
FIG. 3 is a flowchart showing image sensing operations for one frame and display processing.

Next, an operation of taking and displaying a high resolution still image by using an image sensing apparatus according to the first embodiment will be described with reference to a flowchart in FIG. 3 showing image taking and displaying for a single flame and with a diagram in FIG. 4 showing relationship among number of times of image sensing operations, color components, and imaging positions.

The image sensing apparatus takes an image of an object in four image sensing periods (first image sensing period, second image sensing period, third image sensing period, and fourth image sensing period), although each period is short, and displays a single still picture in accordance with the image signals obtained in the four image sensing periods.

First, a parameter k, indicating the number of the image sensing operation, is initialized to "1" at step S10. Then, at step S20, an image of an object is inputted.

More specifically, the image, transmitted through the lens group 1 and the light path shifter 2, is subject to the processed at step S30 (the process at step S30 will be described later in detail), and after that, focused on the CCD 3 and converted into an electrical signal, thereby an analog electrical signal is generated. This signal is converted into a digital signal (called "digital CCD signal", hereinafter) by the A/D converter 4. Each digital CCD signal is inputted into one of the partitions 5-1 to 5-4 of the image memory 5 in accordance with the color component at step 40. The detailed process at step S40 will be described later.

Next, process at step S30 and S40 will be described in detail.

FIG. 4 is a diagram showing the difference in a imaging position in a 4×4 matrix, a unit pattern of the complementary color mosaic filter shown in FIG. 2, of the CCD's photo-sensing surface depending on the image sensing period and color component. Sixteen 4×4 matrices in FIG. 4 having different image sensing periods and color components each other are the same pixel matrix on the CCD's photo-sensing surface.

In the first embodiment, the controller 10 controls the light path shifter 2 so that images of four color components transmitted through the lens group 1 are focused on different places each other at each image sensing period in accordance with the pattern of the complementary color mosaic filter as shown in FIG. 2 in a 2×2 pixel matrix unit on the photo-sensing surface of the CCD 3, and after four image sensing operations have performed, images of each color component have been focused on all the four pixels of the matrix. The 2×2 pixel matrix occupies a quarter area of the 4×4 pixel matrix (upper left, upper right, lower left, and lower right), and four 2×2 pixel matrices in the 4×4 pixel matrix have the same pattern.

In other words, assuming that each component of a 2×2 pixel matrix is described by using x and y coordinates (taking the left upper corner as an origin, and horizontal direction as x axis, and vertical direction as y axis), displacement of Ye component in the upper left 2×2 pixel matrix of the 4×4 pixel matrix shown in FIG. 4 at the respective first to fourth image sensing periods is considered. At the first image sensing period, the Ye component is at the position which is described as (x, y)=(0, 0), at the second image sensing period, it is at the position which be described as (x, y)=(1, 0) (displaced in the horizontal direction by one pixel comparing to the position at the first image sensing period), at the third image sensing period, it is at the position which can be described as (x, y)=(1, 1), (displaced in the vertical direction by one line comparing to the position at the second image sensing period), and at the fourth image sensing period, it is at the position which can be described as (x, y)=(0, 1) (displaced in the horizontal direction but opposite to the direction of the displacement from the first to second image sensing periods, by one pixel comparing to the position at the third image sensing period).

Likewise, regarding the Cy, Mg, and G components, displacements of respective components are controlled so that no two components takes the same position in the 2×2 pixel matrix at the same image sensing period, and so that the imaging position of each component covers all four pixels in the 2×2 pixel matrix after four image sensing periods as shown in FIG. 4.

As described above, all the color components are focused on all the pixels in the 2×2 pixel matrix after the four image sensing periods.

Next, regarding process at step S40, the controller 10 insures that signals of the Ye component of the digital CCD signal obtained in mosaic are written in the partition 5-1 of the image memory 5, signals of the Cy component of the digital CCD signal are written in the partition 5-2 of the image memory 5, signals of the Mg component are written in the partition 5-3, and signals of the G component are written in the partition 5-4 through control lines for address writing. Furthermore, when the first to fourth image sensing periods are over, the controller 10 outputs an address writing control signal so that data of each complementary color component of one frame can be obtained.

Next, at step S50, the value of the parameter k is incremented by one. Then, at step S60, whether or not the value is over 4 is checked. Here, if k≦4, then the process goes back to step S20 to repeat image sensing operation, whereas if k>4, then the process moves to step S70.

When each complementary color data for one frame has been written in the image memory 5, at step S70, the controller 10 outputs an address reading control signal in order to read the complementary color data for one frame at the position of the complementary color image through the control lines for address reading 13-1 to 13-4 and to transmit the data to the DSP 6.

At step S80, the DSP 6 receives the complementary color data for the one frame of complementary color signal image at the position of the complementary color image, generates a RGB signal by performing matrix operation, or the like, then outputs the RGB signal to the three channel D/A converter 7 and the digital interface 9. At step S90, the RGB image signals which are converted into analog signals by the three channel D/A converters 7 are displayed on a high precision display 8, thereby high resolution color still image can be seen. Further, the digital RGB image signal is outputted to an external digital information device via the digital interface 9.

Therefore, according to the first embodiment, by taking an image of an identical object four times, where each image sensing operation is performed so that no two components is focused on the identical pixel position of the CCD, and the identical color component is focused at the different position on the CCD at each of four image sensing operations, and the image signals obtained by the aforesaid control after four image sensing are stored in a memory which is divided so that each partition corresponds to each complementary color component, and an image is displayed after reading the stored image signals, thus the color resolution of an image becomes high, and it is possible to output an image of high quality from which moire stripes are reduced.

In the first embodiment, when an object which slightly displace as time elapses (or does not displace) is taken to display as a still image, an image of as high resolution as the image taken by a literally high resolution CCD can be obtained by taking the same object a plurality of times by using an inexpensive and relatively low resolution CCD without using an expensive and high resolution CCD, thus contributing to reduce manufacturing cost of the apparatus.

Needless to say, it is possible to apply this embodiment to an image sensing apparatus using an expensive and high resolution CCD, and in that case, further higher resolution clear still image can be displayed, although the quality of the image depends on the image display quality of the apparatus.

It should be noted that, in the first embodiment, one frame of a still image is generated by taking an image of an object four times, however, the present invention is not limited to this, and can be generated, for example, after two image sensing periods to display the still image of a single frame.

[Second Embodiment]

In the first embodiment, operational modes of the image sensing apparatus are not explained. In a second embodiment, an image apparatus having a plural operational modes will be described.

FIG. 5 is a block diagram illustrating a configuration of an image sensing apparatus having two operational modes according to the second embodiment. In the following explanation, the same consisting elements, devices, or the like, as in the first embodiment are referred by the same reference numerals, and their explanation is omitted, and only characteristic elements and their operations will be described. In FIG. 5, reference numeral 14 denotes a data synchronizer for applying a sample and hold to a dot-sequentially inputted image signal inputted, delaying it, and outputting complementary color signals in parallel; 15, a camera signal processor; 16, a three channel D/A converter; 17, a color display; 18, a switch for switching between two operational modes.

Next, an operation of the image sensing apparatus having aforesaid configuration will be described.

The operational modes of the image sensing apparatus according to the second embodiment is a normal moving picture mode, and a high resolution still picture mode.

First, in the normal moving mode, the controller 10 controls the light path shifter 2 so that an image inputted through the lens group 1 is focused on a fixed position on the photo-sensing surface of the CCD 3. The controller 10 does not send an address writing signal via the control lines for address writing 12-1 to 12-4, nor an address reading signal via the control lines for address reading 13-1 to 13-4. Therefore, the digital CCD signal is not transmitted to the DSP 6.

Meanwhile, the digital CCD signal which is converted from analog signal, photoelectric-converted by the CCD 3, by the A/D converter 4 is transmitted to the data synchronizer 14. The data synchronizer 14 obtains complementary color signal (Ye, Cy, Mg, G) from color carrier components of the input digital CCD signal by the spatial interpolation, and the complementary color signal is transmitted to the DSP 15 where a digital RGB signal is generated. The digital RGB signal is converted into an analog RGB signal by the three channel A/D converter 16, and displayed as a color moving image on the color display 17.

Next, in a high resolution still image mode, as described in the first embodiment, the controller 10 inputs complementary color signals to respective partitions 5-1 to 5-4 of the image memory 5 by taking an image of an identical object for four times, and the complementary color signals are processed and a RGB digital signal is obtained. The RGB digital signal is converted into a RGB analog signal by the three channel D/A converter 7, and displayed as a high precision color still image on the high precision color display 8. Note that a color printer can be used instead of the color display 8.

According to the configuration of the image sensing apparatus as shown in FIG. 5, the complementary color signal is also inputted into the data synchronizer 14 as the aforesaid operation is carried on, thus the digital CCD signal is also processed as in the normal moving image mode by the DSP 15 and the three channel D/A converter 16, a relatively low resolution color still image is also displayed on the color display 17.

Therefore, according to the second embodiment, it is possible not only to display a moving image in relatively a low resolution but also to display a still image in high resolution in accordance with the set operational mode.

It should be noted that, if the processing performance of an apparatus is high and the sensitivity of a CCD is also considerably high, by repeating the operation in the high resolution still image mode for a predetermined number of times in a predetermined time period (e. g., 60 times/second), a high resolution moving image can be displayed.

Further, in the second embodiment, the obtained color image is displayed on a display, however, the present invention is not limited to this. For example, output from the DSP 15 can be stored in a VTR apparatus as a standard video signal of a brightness/chromatic signal and a composite signal, or the apparatus is configured so that RGB output from the DSP 15 can be transmitted to a digital information device, such as a computer.

In the first and the second embodiments, a case where a frame transfer type CCD is used is explained, however, the present invention is not limited to this. For example, by changing the amount of the displacement in pixel in the vertical direction as shown in FIG. 4 to by two lines, a field transfer type CCD can be used.

The present invention can be applied to a system constituted by a plurality of devices, or to an apparatus comprising a single device.

As many apparently widely different embodiments of the present invention can be made without departing from the spirit and scope thereof, it is to be understood that the invention is not limited to the specific embodiments thereof except as defined in the appended claims.

What is claimed is:

1. An image sensing apparatus comprising:
   image pickup means for generating an image signal;
   displacing means for displacing a relative position of an optical image and an image sensing surface of said image pickup means;
   mode selecting means for selecting a still mode for synthesizing a high-resolution still image signal from a plurality of displaced image signals or a movie mode for continuously forming a plurality of consecutive low-resolution image signals;
   first control means for generating a synthesized still image signal from a plurality of image signals, each being displaced from one another by said displacing means when the still mode is selected; and second control means for generating a plurality of movie image signals, each not being displaced from one another by said displacing means when the movie mode is selected; and movie display means for displaying the plurality of movie image signals.

2. The apparatus according to claim 1, wherein said image pickup means includes color separation filters on the image sensing surface of said image pickup means.

3. The apparatus according to claim 2, wherein the color separation filters include filters for four different colors.

4. The apparatus according to claim 2, wherein the color separation filters include filters for complementary colors.

5. The apparatus according to claim 1, wherein said displacing means includes a moving optical member for cyclically displacing the relative position of the optical image and the image sensing surface of said image pickup means.

6. An image sensing apparatus comprising:

an image pickup device for generating an image signal;

a displacing mechanism for displacing a relative position of an optical image and an image sensing surface of said image pickup device;

a mode selecting circuit for selecting a still mode for synthesizing a high-resolution still image signal from a plurality of displaced image signals or a movie mode for continuously forming a plurality of consecutive low-resolution image signals;

a first control circuit for generating a synthesized still image signal from a plurality of image signals, each being displaced from one another by said displacing mechanism when the still mode is selected; and a second control circuit for generating a plurality of movie image signals, each not being displaced from one another by said displacing mechanism when the movie mode is selected; and a movie display unit for displaying the plurality of movie image signals.

7. The apparatus according to claim 6, wherein said image pickup device includes color separation filters on the image sensing surface of said image pickup device.

8. The apparatus according to claim 7, wherein the color separation filters include filters for four different colors.

9. The apparatus according to claim 7, wherein the color separation filters include filters for complementary colors.

10. The apparatus according to claim 6, wherein said displacing mechanism includes a moving optical member for cyclically displacing the relative position of the optical image and the image sensing surface of said image pickup device.

* * * * *

UNITED STATES PATENT AND TRADEMARK OFFICE
CERTIFICATE OF CORRECTION

PATENT NO.   : 6,031,569
DATED        : February 29, 2000
INVENTOR(S)  : Kousuke Nobuoka et al.

It is certified that error appears in the above-identified patent and that said Letters Patent is hereby corrected as shown below:

Title page,
Please delete "IMAGE SENSING METHOD AND APPARATUS UTILIZING THE SAME" and insert therefor -- IMAGE SENSING APPARATUS HAVING MOVING IMAGE MODE AND HIGH RESOLUTION STILL IMAGE MODE --.

Column 6,
Line 36, "$K \leq 4$," should read -- $K \leq 4$, --.

Signed and Sealed this

Twenty-second Day of January, 2002

Attest:

JAMES E. ROGAN
*Attesting Officer*     *Director of the United States Patent and Trademark Office*

UNITED STATES PATENT AND TRADEMARK OFFICE
CERTIFICATE OF CORRECTION

PATENT NO.    : 6,031,569
DATED         : February 29, 2000
INVENTOR(S)   : Nobuoka et al.

It is certified that error appears in the above-identified patent and that said Letters Patent is hereby corrected as shown below:

Title page,
Item [54], Title, should read -- IMAGE SENSING APPARATUS HAVING MOVING IMAGE MODE AND HIGH RESOLUTION STILL IMAGE MODE --.

Signed and Sealed this

Seventeenth Day of August, 2004

JON W. DUDAS
*Acting Director of the United States Patent and Trademark Office*